US011834243B2

(12) United States Patent
Broering et al.

(10) Patent No.: US 11,834,243 B2
(45) Date of Patent: Dec. 5, 2023

(54) ENHANCED FLEXIBLE MATERIAL AND ARTICLES FORMED THEREFROM

(71) Applicant: The Procter & Gamble Company, Cincinnati, OH (US)

(72) Inventors: Shaun Thomas Broering, Ft. Thomas, KY (US); Karen Denise MCaffry, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 306 days.

(21) Appl. No.: 16/458,231

(22) Filed: Jul. 1, 2019

(65) Prior Publication Data

US 2019/0322431 A1 Oct. 24, 2019

Related U.S. Application Data

(63) Continuation of application No. 15/268,914, filed on Sep. 19, 2016, now abandoned, which is a
(Continued)

(51) Int. Cl.
*B65D 75/00* (2006.01)
*B32B 27/32* (2006.01)
(Continued)

(52) U.S. Cl.
CPC ............ *B65D 75/006* (2013.01); *B31B 70/00* (2017.08); *B32B 3/28* (2013.01); *B32B 27/32* (2013.01);
(Continued)

(58) Field of Classification Search
CPC ...... B65D 75/006; B65D 33/00; B31B 70/00; B32B 3/28; B32B 27/32; B65F 1/0006
See application file for complete search history.

(56) References Cited

U.S. PATENT DOCUMENTS 3,857,144 A 12/1974 Bustin
4,653,640 A 3/1987 Akao
(Continued)

FOREIGN PATENT DOCUMENTS

WO WO 2000/78627 A2 12/2000
WO WO 2001/98161 A2 12/2001
WO WO 2006/052695 5/2006

OTHER PUBLICATIONS

PCT International Search Report dated Sep. 22, 2011.
(Continued)

*Primary Examiner* — Kelly M Gambetta
(74) *Attorney, Agent, or Firm* — George H. Leal; Abbey A. Lopez

(57) ABSTRACT

A flexible film, and articles comprising the film, comprises interleaved pluralities of each of first bands and second bands disposed adjacent to the first bands. Both the first and second bands have a length and a width; the first bands comprise a first film basis weight and first and second regions. The first regions and second regions being comprised of the same material composition. The first regions undergo a substantially molecular-level deformation and the second regions initially undergo a substantially geometric deformation when the sheet material is subjected to an applied elongation along at least one axis. The second bands comprise a second film basis weight and a plurality of corrugations disposed along the length of the band. In this aspect the material may be described as having alternating bands of structural-elastic-like film and ring-rolled film.

11 Claims, 7 Drawing Sheets

Related U.S. Application Data continuation of application No. 13/179,201, filed on Jul. 8, 2011, now abandoned.

(60) Provisional application No. 61/363,336, filed on Jul. 12, 2010.

(51) Int. Cl.

| | | |
|---|---|---|
| *B65D 33/00* | (2006.01) | |
| *B65F 1/00* | (2006.01) | |
| *B32B 3/28* | (2006.01) | |
| *B31B 70/00* | (2017.01) | |
| *B31B 150/00* | (2017.01) | |
| *B31B 160/10* | (2017.01) | |
| *B31B 70/88* | (2017.01) | |

(52) U.S. Cl.
CPC ............ *B65D 33/00* (2013.01); *B65F 1/0006* (2013.01); *B31B 70/88* (2017.08); *B31B 2150/00* (2017.08); *B31B 2160/10* (2017.08); *Y10T 428/13* (2015.01); *Y10T 428/24479* (2015.01); *Y10T 428/24694* (2015.01)

(56) References Cited

U.S. PATENT DOCUMENTS

| | | | |
|---|---|---|---|
| 4,730,942 A | 3/1988 | Fulcher | |
| 5,518,801 A | 5/1996 | Chappell et al. | |
| 5,845,995 A | 12/1998 | Starlinger | |
| 6,391,411 B1 | 5/2002 | Duckwall, Jr. | |
| D518,648 S | 4/2006 | Broering et al. | |
| 7,255,903 B1 | 8/2007 | Mudar | |
| 2002/0126919 A1* | 9/2002 | Jackson | B65D 33/00 383/42 |
| 2006/0093766 A1* | 5/2006 | Savicki | B31F 1/07 428/35.2 |
| 2008/0217809 A1* | 9/2008 | Zhao | A61F 13/15699 264/229 |
| 2008/0221538 A1 | 9/2008 | Zhao | |
| 2009/0105678 A1* | 4/2009 | Minoguchi | A61F 13/2051 604/379 |
| 2011/0317945 A1 | 12/2011 | Waldron | |
| 2012/0003447 A1 | 1/2012 | Odonnell | |
| 2012/0033900 A1 | 2/2012 | Fraser | |
| 2012/0063706 A1* | 3/2012 | Fraser | B29C 66/81435 493/243 |
| 2012/0064271 A1 | 3/2012 | Broering | |
| 2012/0134606 A1 | 5/2012 | Borchardt | |
| 2013/0011084 A1 | 1/2013 | Broering | |
| 2013/0188891 A1 | 7/2013 | Maxwell | |
| 2014/0023829 A1 | 1/2014 | Broering | |
| 2015/0104121 A1 | 4/2015 | Broering | |
| 2017/0001780 A1 | 1/2017 | Broering | |

OTHER PUBLICATIONS

All Office Actions, U.S. Appl. No. 15/268,914.
All Office Actions; U.S. Appl. No. 13/179,201.
All Office Actions; U.S. Appl. No. 14/578,158.

* cited by examiner

US 11,834,243 B2

ENHANCED FLEXIBLE MATERIAL AND ARTICLES FORMED THEREFROM

FIELD OF THE INVENTION

The invention relates to physically enhanced flexible polymeric films and articles comprised of such films. The invention relates particularly to flexible polymeric films having enhanced physical structures and properties, and articles made therefrom.

BACKGROUND OF THE INVENTION

Polymeric films are well known in the art, as are articles such as bags for storage and disposal made from such films. Altering the geometry of a flat film while maintaining the basis weight of the film is known to have the potential of imparting elastic-like properties to the film and to articles made from the altered film. The costs associated with such films and articles are often directly related to the quantity of material present in the final article and/or the basis weight of the films used. Films may be drawn to reduce the film gauge and therefore the amount of material used for a given unit area. Such drawing or gauge reduction techniques may favorably impact the cost associated with a finished article but often do so at a reduction in the performance of the film and article due to the reduction in film gauge and associated basis weight.

What is desired is a way of reducing the material requirements for films and corresponding articles without equivalent reductions in film and article performance.

SUMMARY OF THE INVENTION

In one aspect, a flexible film comprises interleaved pluralities of each of first bands and second bands disposed adjacent to the first bands. Both the first and second bands have a length and a width, the first bands comprise a first film basis weight and first and second regions. The first regions and the second regions being comprised of the same material composition. The first regions undergo a substantially molecular-level deformation and the second regions initially undergo a substantially geometric deformation when the sheet material is subjected to an applied elongation along at least one axis. The first regions and the second regions are visually distinct from one another. The second regions include a plurality of raised rib-like elements and the first regions are substantially free of rib-like elements. The second bands comprise a second film basis weight and a plurality of corrugations disposed along the length of the band. In this aspect the material may be described as having alternating bands of structural-elastic-like film and ring-rolled film.

In one aspect, a flexible bag comprises at least one sheet of flexible sheet material assembled to form a semi-enclosed container having an opening defined by a periphery. The sheet of flexible material comprises interleaved pluralities of each of first bands and second bands disposed adjacent to the first bands. Both the first and second bands have a length and a width, the first bands comprise a first film basis weight and first and second regions. The first regions and the second regions being comprised of the same material composition. The first regions undergo a substantially molecular-level deformation and the second regions initially undergo a substantially geometric deformation when the sheet material is subjected to an applied elongation along at least one axis. The first regions and the second regions are visually distinct from one another. The second regions include a plurality of raised rib-like elements and the first regions are substantially free of rib-like elements. The second bands comprise a second film basis weight and a plurality of corrugations disposed along the length of the band. In this aspect the material and bag may be described as having alternating bands of structural-elastic-like film and ring-rolled film.

DETAILED DESCRIPTION OF THE INVENTION

As used herein, basis weight, refers to the weight per unit area. Basis weight may be expressed in units of lbs/ft2, or g/m2.

As utilized herein, the term "flexible" is utilized to refer to materials which are capable of being flexed or bent, especially repeatedly, such that they are pliant and yieldable in response to externally applied forces. Accordingly, "flexible" is substantially opposite in meaning to the terms inflexible, rigid, or unyielding. Materials and structures which are flexible, therefore, may be altered in shape and structure to accommodate external forces and to conform to the shape of objects brought into contact with them without losing their integrity. Flexible bags of the type commonly available are typically formed from materials having consistent physical properties throughout the bag structure, such as stretch, tensile, and/or elongation properties as well as material basis weight.

Figure 3A:
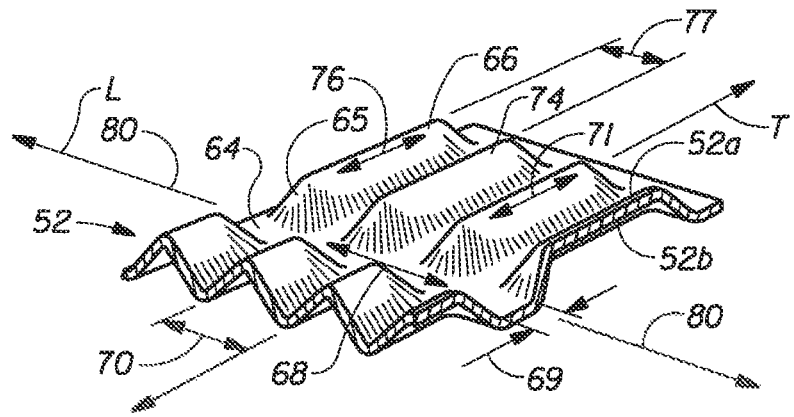
FIG. 3A is a segmented, perspective illustration of the polymeric film material of flexible bags of the present invention in a substantially untensioned condition.

Referring now to FIG. 3A, first bands 52 include a "strainable network" of distinct regions. As used herein, the term "strainable network" refers to an interconnected and interrelated group of regions which are able to be extended to some useful degree in a predetermined direction providing the first bands with an elastic-like behavior in response to an applied and subsequently released elongation. The strainable network includes at least a first region 64 and a second region 66. First bands 52 include a transitional region 65 which is at the interface between the first region 64 and the second region 66. The transitional region 65 will exhibit complex combinations of the behavior of both the first region and the second region. It is recognized that every embodiment of such first bands suitable for use in accordance with the present invention will have a transitional region; however, such bands are defined by the behavior of the first region 64 and the second region 66. Therefore, the ensuing description will be concerned with the behavior of the first bands in the first regions and the second regions only since it is not dependent upon the complex behavior of the first bands in the transitional regions 65. First bands 52 have a first surface 52a and an opposing second surface 52b. In the embodiment shown in FIG. 3A, the strainable network includes a plurality of first regions 64 and a plurality of second regions 66. In one embodiment, the first regions 64 have a first axis 68 and a second axis 69, wherein the first axis 68 is longer than the second axis 69. The first axis 68 of the first region 64 is substantially parallel to the longitudinal axis "L" of the first bands 52 while the second axis 69 is substantially parallel to the transverse axis "T" of the first bands 52. In one embodiment, the second axis of the first region, the width of the first region, is from about 0.01 inches to about 0.5 inches. In one embodiment from about 0.03 inches to about 0.25 inches. The second regions 66 have a first axis 70 and a second axis 71. The first axis 70 is substantially parallel to the longitudinal axis of the first bands 52, while the second axis 71 is substantially parallel to the transverse axis of the first bands 52. In one embodiment, the second axis of the second region, the width of the second region, is from about 0.01 inches to about 2.0 inches. In one embodiment from about 0.125 inches to about 1.0 inches. In the embodiment of FIG. 3A, the first regions 64 and the second regions 66 are substantially linear, extending continuously in a direction substantially parallel to the longitudinal axis of the first bands 52.

The first region 64 has an elastic modulus E1 and a cross-sectional area A1. The second region 66 has a modulus E2 and a cross-sectional area A2.

In the illustrated embodiment, the first bands 52 have been "formed" such that the first bands 52 exhibits a resistive force along an axis, which in the case of the illustrated embodiment is substantially parallel to the longitudinal axis of the web, when subjected to an applied axial elongation in a direction substantially parallel to the longitudinal axis. As used herein, the term "formed" refers to the creation of a desired structure or geometry upon a first band that will substantially retain the desired structure or geometry when it is not subjected to any externally applied elongations or forces. A first band of the present invention is comprised of at least a first region and a second region, wherein the first region is visually distinct from the second region. As used herein, the term "visually distinct" refers to features of the first bands which are readily discernible to the normal naked eye when the first bands or objects embodying the first bands are subjected to normal use. As used herein the term "surface-pathlength" refers to a measurement along the topographic surface of the region in question in a direction substantially parallel to an axis. The method for determining the surface-pathlength of the respective regions can be found in the Test Methods section of U.S. Pat. No. 5,518,801 issues to Chappell et al. on Feb. 28, 1994. Methods for forming such first bands useful in the present invention include, but are not limited to, embossing by mating plates or rolls, thermoforming, high pressure hydraulic forming, or casting. While the entire portion of the web 52 has been subjected to a forming operation, the present invention may also be practiced by subjecting to formation only a portion thereof, e.g., a portion of the material comprising the bag body, as will be described in detail below.

In the embodiment shown in FIG. 3A, the first regions 64 are substantially planar. That is, the material within the first region 64 is in substantially the same condition before and after the formation step undergone by web 52. The second regions 66 include a plurality of raised rib-like elements 74. The rib-like elements may be embossed, debossed or a combination thereof. The rib-like elements 74 have a first or major axis 76 which is substantially parallel to the transverse axis of the web 52 and a second or minor axis 77 which is substantially parallel to the longitudinal axis of the web 52. The length parallel to the first axis 76 of the rib-like elements 74 is at least equal to, and in one embodiment longer than the length parallel to the second axis 77.

In one embodiment, the ratio of the length parallel to the first axis 76 to the length parallel to the second axis 77 of the rib-like elements 74 is at least about 1:1 or greater, and in another embodiment at least about 2:1 or greater.

The rib-like elements 74 in the second region 66 may be separated from one another by unformed areas. In one embodiment, the rib-like elements 74 are adjacent one another and are separated by an unformed area of less than 0.10 inches as measured perpendicular to the major axis 76 of the rib-like elements 74. In one embodiment, the rib-like elements 74 are contiguous having essentially no unformed areas between them.

The first region 64 and the second region 66 each have a "projected pathlength". As used herein the term "projected pathlength" refers to the length of a shadow of a region that would be thrown by parallel light. The projected pathlength of the first region 64 and the projected pathlength of the second region 66 are equal to one another.

The first region 64 has a surface-pathlength, L1, less than the surface-pathlength, L2, of the second region 66 as measured topographically in a direction parallel to the longitudinal axis of the web 52 while the web is in an untensioned condition. In one embodiment, the surface-pathlength of the second region 66 is at least about 15% greater than that of the first region 64. In one embodiment at least about 30% greater than that of the first region. In one embodiment at least about 70% greater than that of the first region. In general, the greater the surface-pathlength of the second region, the greater will be the elongation of the web before encountering the force wall. Suitable techniques for measuring the surface-pathlength of such materials are described in the above-referenced and above-incorporated Chappell et al. patent.

First bands 52 exhibit a modified "Poisson lateral contraction effect" substantially less than that of an otherwise identical base web of similar material composition. The method for determining the Poisson lateral contraction effect of a material can be found in the Test Methods section of the above-referenced and above-incorporated Chappell et al. patent. In one embodiment, the Poisson lateral contraction effect of webs suitable for use in the present invention is less than about 0.4 when the web is subjected to about 20% elongation. In one embodiment, the webs exhibit a Poisson lateral contraction effect less than about 0.4 when the web is subjected to about 40, 50 or even 60% elongation. In one embodiment, the Poisson lateral contraction effect is less than about 0.3 when the web is subjected to 20, 40, 50 or 60% elongation. The Poisson lateral contraction effect of such webs is determined by the amount of the web material which is occupied by the first and second regions, respectively. As the area of the first bands occupied by the first region increases the Poisson lateral contraction effect also increases. Conversely, as the area of the first bands occupied by the second region increases the Poisson lateral contraction effect decreases. In one embodiment, the percent area of the first bands occupied by the first area is from about 2% to about 90%. In one embodiment from about 5% to about 50%.

For first bands 52, the direction of applied axial elongation, D, indicated by arrows 80 in FIG. 3A, is substantially perpendicular to the first axis 76 of the rib-like elements 74. The rib-like elements 74 are able to unbend or geometrically deform in a direction substantially perpendicular to their first axis 76 to allow extension in web 52.

Figure 3B:
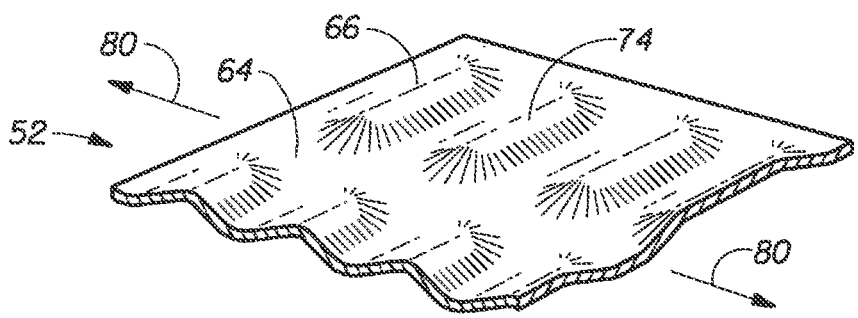
FIG. 3B is a segmented, perspective illustration of the polymeric film material of flexible bags according to the present invention in a partially-tensioned condition.

Referring now to FIG. 3B, as web of first bands 52 is subjected to an applied axial elongation, D, indicated by arrows 80 in FIG. 3B, the first region 64 having the shorter surface-pathlength, L1, provides most of the initial resistive force, P1, as a result of molecular-level deformation, to the applied elongation. In this stage, the rib-like elements 74 in the second region 66 are experiencing geometric deformation, or unbending and offer minimal resistance to the applied elongation. In transition to the next stage, the rib-like elements 74 are becoming aligned with (i.e., coplanar with) the applied elongation. That is, the second region is exhibiting a change from geometric deformation to molecular-level deformation. This is the onset of the force wall. In the stage seen in FIG. 3C, the rib-like elements 74 in the second region 66 have become substantially aligned with (i.e., coplanar with) the plane of applied elongation (i.e. the second region has reached its limit of geometric deformation) and begin to resist further elongation via molecular-level deformation. The second region 66 now contributes, as a result of molecular-level deformation, a second resistive force, P2, to further applied elongation. The resistive forces to elongation provided by both the molecular-level deformation of the first region 64 and the molecular-level deformation of the second region 66 provide a total resistive force, PT, which is greater than the resistive force which is provided by the molecular-level deformation of the first region 64 and the geometric deformation of the second region 66.

Figure 3C:
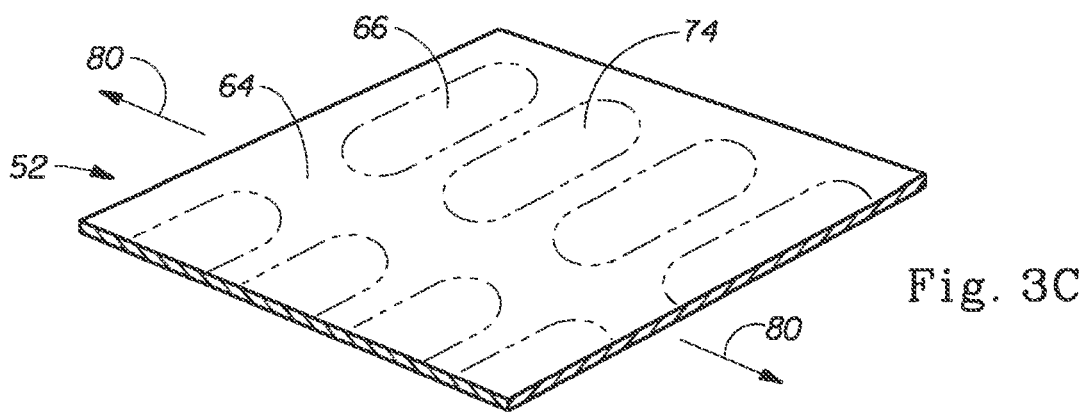
FIG. 3C is a segmented, perspective illustration of the polymeric film material of flexible bags according to the present invention in a greater-tensioned condition.

The resistive force P1 is substantially greater than the resistive force P2 when (L1+D) is less than L2. When (L1+D) is less than L2 the first region provides the initial resistive force P1, generally satisfying the equation: $P1=(A1 \times E1 \times D)/L1$ When (L1+D) is greater than L2 the first and second regions provide a combined total resistive force PT to the applied elongation, D, generally satisfying the equation: $PT=((A1 \times E1 \times D)/L1)+((A2 \times E2 \times |L1+D-L2|)/L2)$. The maximum elongation occurring while in the stage corresponding to FIGS. 3A and 3B, before reaching the stage depicted in FIG. 3C, is the "available stretch" of the formed web material. The available stretch corresponds to the distance over which the second region experiences geometric deformation. The range of available stretch can be varied from about 10% to 100% or more, and can be largely controlled by the extent to which the surface-pathlength L2 in the second region exceeds the surface-pathlength L1 in the first region and the composition of the base film. The term available stretch is not intended to imply a limit to the elongation which the web of the present invention may be subjected to as there are applications where elongation beyond the available stretch is desirable.

When the first bands are subjected to an applied elongation, the first bands exhibit an elastic-like behavior as it extends in the direction of applied elongation and returns to its substantially untensioned condition once the applied elongation is removed, unless the first bands are extended beyond the point of yielding. The first bands are able to undergo multiple cycles of applied elongation without losing their ability to substantially recover. Accordingly, the web is able to return to its substantially untensioned condition once the applied elongation is removed. While the first bands may be easily and reversibly extended in the direction of applied axial elongation, in a direction substantially perpendicular to the first axis of the rib-like elements, the web material is not as easily extended in a direction substantially parallel to the first axis of the rib-like elements. The formation of the rib-like elements allows the rib-like elements to geometrically deform in a direction substantially perpendicular to the first or major axis of the rib-like elements, while requiring substantially molecular-level deformation to extend in a direction substantially parallel to the first axis of the rib-like elements.

The amount of applied force required to extend the web is dependent upon the composition and cross-sectional area of the first bands and the width and spacing of the first regions, with narrower and more widely spaced first regions requiring lower applied extensional forces to achieve the desired elongation for a given composition and cross-sectional area. The first axis, (i.e., the length) of the first regions is in one embodiment greater than the second axis, (i.e., the width) of the first regions in one embodiment with a length to width ratio of from about 5:1 or greater.

The depth and frequency of rib-like elements can also be varied to control the available stretch of a web of first bands suitable for use in accordance with the present invention. The available stretch is increased if for a given frequency of rib-like elements, the height or degree of formation imparted on the rib-like elements is increased. Similarly, the available stretch is increased if for a given height or degree of formation, the frequency of the rib-like elements is increased. The selection of rib-like element depth or frequency versus band 2 stretch (or basis weight reduction) is chosen to balance overall film and article mechanical properties. A method to closely approximate the required formation required in band 1 versus band 2 is obtained by mechanical property of each of the band in sufficient size for testing. For formation using solid state formation method, this can be obtained by changing the DOE for each band and relating this DOE to overall film properties. A quasi-matched set of properties is preferred. The resulting tooling can be designed using different patterns and tooling heights in band 1 versus band 2. While not to be limited, it is believed that the properties will be matched best and the most aesthetic design achieved, if the width of the second band is limited to less than 0.75 inch and preferably less than 0.5 inch width. Without being limited, it is believed that the best properties will result in designs where the width of the second band is less than 0.75 inches and preferably less than 0.5 inches and the width of the second band does not exceed 60% of the width the sum for the first band and the second band. If more than two bands are included in the design, it is believed that the second band should not exceed 60% of the width of the sum of all band regions.

There are several functional properties that can be controlled through the application of such materials to flexible bags of the present invention. The functional properties are the resistive force exerted by the first bands against an applied elongation and the available stretch of the first bands before the force wall is encountered. The resistive force that is exerted by the first bands against an applied elongation is a function of the material (e.g., composition, molecular structure and orientation, etc.) and cross-sectional area and the percent of the projected surface area of the first bands that is occupied by the first region. The higher the percent area coverage of the first bands by the first region, the higher the resistive force that the web will exert against an applied elongation for a given material composition and cross-sectional area. The percent coverage of the first bands by the first region is determined in part, if not wholly, by the widths of the first regions and the spacing between adjacent first regions.

The available stretch of the web material is determined by the surface-pathlength of the second region. The surface-pathlength of the second region is determined at least in part by the rib-like element spacing, rib-like element frequency and depth of formation of the rib-like elements as measured perpendicular to the plane of the web material. In general, the greater the surface-pathlength of the second region the greater the available stretch of the web material. As discussed above with regard to FIGS. 3A-3C, the first bands 52 initially exhibit a certain resistance to elongation provided by the first region 64 while the rib-like elements 74 of the second region 66 undergo geometric motion. As the rib-like elements transition into the plane of the first regions of the material, an increased resistance to elongation is exhibited as the entire first band then undergoes molecular-level deformation. Accordingly, first bands of the type depicted in FIGS. 3A-3C and described in the above-referenced and above-incorporated Chappell et al. patent provide the performance advantages of the present invention when formed into closed containers such as the flexible bags of the present invention.

An additional benefit realized by the utilization of the aforementioned first bands in constructing flexible bags according to the present invention is the increase in visual and tactile appeal of such materials. Polymeric films commonly utilized to form such flexible polymeric bags are typically comparatively thin in nature and frequently have a smooth, shiny surface finish. While some manufacturers utilize a small degree of embossing or other texturing of the film surface, at least on the side facing outwardly of the finished bag, bags made of such materials still tend to exhibit a slippery and flimsy tactile impression. Thin materials coupled with substantially two-dimensional surface geometry also tend to leave the consumer with an exaggerated impression of the thinness, and perceived lack of durability, of such flexible polymeric bags.

In contrast, first bands useful in accordance with the present invention such as those depicted in FIGS. 3A-3C exhibit a three-dimensional cross-sectional profile wherein the first bands are (in an un-tensioned condition) deformed out of the predominant plane of the first bands. This provides additional surface area for gripping and dissipates the glare normally associated with substantially planar, smooth surfaces. The three-dimensional rib-like elements also provide a "cushiony" tactile impression when the bag is gripped in one's hand, also contributing to a desirable tactile impression versus conventional bag materials and providing an enhanced perception of thickness and durability. The additional texture also reduces noise associated with certain types of film materials, leading to an enhanced aural impression.

Referring to FIGS. 1, 2, 4, 5, 6, and 7, the second bands 20 are formed into a pattern of substantially continuous corrugations 32 along the length of the bands 20, 30, that is, substantially parallel to the major direction of the bands 20, 30. The corrugations 32 are formed concurrently with the ribs 74 of the first bands 30. The corrugations 32 are formed by ring-rolling the relevant portion of the film. Ring-rolling the portion of the film segmentally stretches and yields the film into a corrugated structure while simultaneously reducing the basis weight of the ring-rolled portion of the film and stretching or extending the width of that portion. The stretch of each second band 20 generally results in plastic set of the film by 20 to 60%. This stretch lowers the basis weight of the film in each second band 20 by 62 to 83% of the starting material.

The combination of interleaved first and second bands of formed film provides the majority of the physical performance of an identical base film which has been formed only with the structures of the first bands. As the ring-rolled second bands are stretched or expanded, the interleaved pattern yields the additional benefit of providing a final film having substantially the same performance while utilizing significantly less material.

The forming of the first and second bands are preferentially performed simultaneously. If the forming depth for the first band and the stretching length for the second band differ then tooling must be designed to achieve the results simultaneously. Not to be limited to the following examples, one option to achieve simultaneous but differential forming strains is to use different forming tooth heights for each of the bands. Other options such as using different tooth pitch in the first band versus the second band can also be practiced. It is also possible to perform formation of the first band either first or second and the second band either second or first in sequence.

In forming the materials of the invention, a sheet of film may be processed between patterned plates, or a continuous web of film may be processed between patterned rollers. In one embodiment, the depth of engagement of the patterned features forming the first bands differs from the depth of engagement of the patterned features forming the second bands. In this embodiment, the depth of engagement for the second bands is less than the depth of engagement for the first bands. In one embodiment, the first bands are formed with a depth of engagement of about 0.038" (0.965 mm) and the second bands are concurrently formed with a depth of engagement of about 0.024" (0.610 mm) or with a DOE difference of about 0.014" (0.356 mm). This variation in the depth of engagement between the two bands is achieved by using a forming element having individual forming features with different heights interacting with a mating element having features of a uniform height. As an example, the features associated with the first bands may have a height of about 0.080" (2.03 mm) while the features associated with the second bands have a height of about 0.066" (1.68 mm).

EXAMPLES

Example #1

A LLDPE film made from 89% Tuflin XHS 7091, 8% Fleximer ETSE 9068 and 3% white pigment masterbatch. The Tuflin and Fleximer are from Dow Chemical, Midland, MI and the white pigment masterbatch is from Ampecet, Tarrytown, New York. The film was blown into a 0.0009 inch thick film of 30 inch width. The film was slit to a 10 inch width prior to solid state formation. The film was processed using either a 0.040 inch pitch ring roll or a 0.040 inch pitch seven tooth diamond SELF pattern as shown in USD518648S1. The mechanical properties of the film were measured for tensile properties per ASTM D882, tear properties per ASTM D1922, and dart drop per ASTM D1709 (D4272,?). The mechanical properties from SELF and ring roll films are exhibited in Table SRR. The properties of a film formed via SELF pattern at a depth of 0.038 inch can be matched with ring roll film with the exception of dart drop. The best property match excluding dart drop is a ring roll film deformed to a depth of 0.024 inches.

TABLE SRR

| Pattern SELF/ RR | DOE (in) | MD Tensile | | | TD Tensile | | | Ply Direct | Ply Direct | |
|---|---|---|---|---|---|---|---|---|---|---|
| | | Peak Load (lbf) | Strn At Break (%) | Energy To Break (in*lbf) | Peak Load (lbf) | Strn At Break (%) | Energy To Break (in*lbf) | MD Tear Index (gf) | CD Tear Index (gf) | Dart g/mil |
| SELF | 0.038 | 3.61 | 434 | 15.57 | 2.73 | 503.49 | 15.35 | 288 | 315 | 332 |
| RR | 0.020 | 4.99 | 498 | 21.03 | 4.99 | 596.03 | 25.92 | 385 | 259 | 169 |
| RR | 0.024 | 4.41 | 472 | 17.97 | 4.17 | 446.87 | 18.05 | 281 | 239 | 180 |
| RR | 0.028 | 3.57 | 413 | 13.76 | 4.15 | 456.15 | 17.60 | 278 | 173 | 158 |

Example #2

Figure 6:
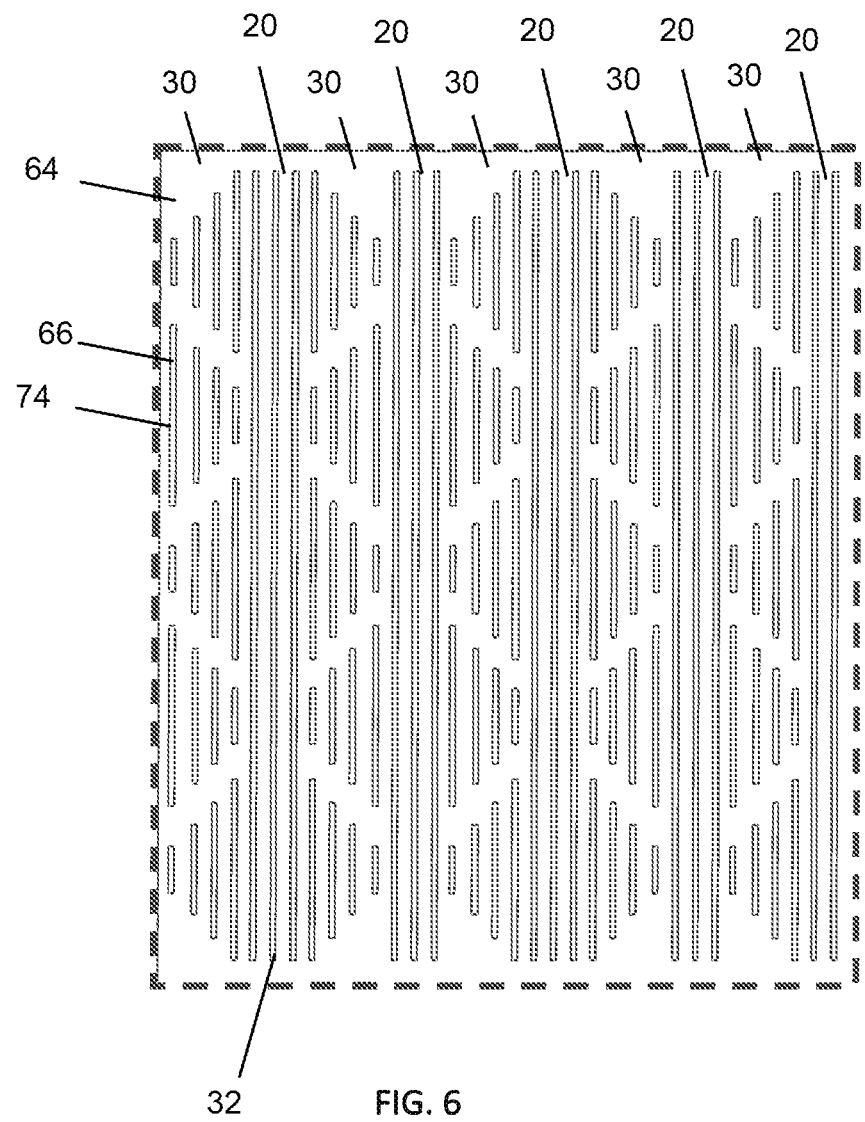
FIG. 6 is a schematic plan view of a portion of the material of the bags of the present invention illustrating a symmetrical pattern.

The same film as described in Example #1 was formed into the hybrid SELF/RR design exhibited in FIG. 6/7 and Figure MOD5 Diamond. The tooling was fabricated with a difference in tool height of 0.014 inches with the SELF band being deformed to the greater degree. The results are in Table HYBRID.

Example #3

The same film as described in Example #1 was formed into the hybrid SELF/RR design exhibited in Figure MOD5 Diamond. The tooling was fabricated with a difference in tool height of 0.011 inches with the SELF band being deformed to the greater degree. The results are in Table HYBR.

The respective patterns of the first bands and second bands may comprise a variety of patterns. Generally, the pattern of the first bands comprises a set of substantially parallel features along the length of the band. Each feature comprises a series of ribs as described above. The position of the ribs in adjacent features together with the unformed portions in the bands determines the overall pattern of the bands.

Figure 1:
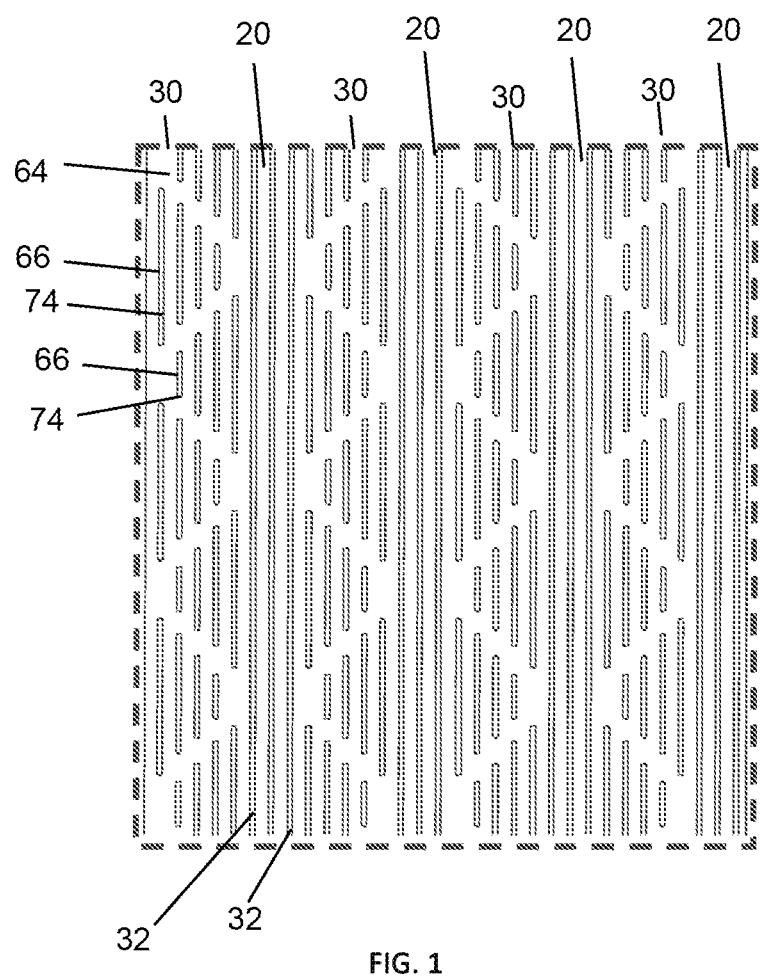
FIG. 1 is a schematic plan view of a portion of the material of the bags of the present invention illustrating a symmetrical pattern.
Figure 4:
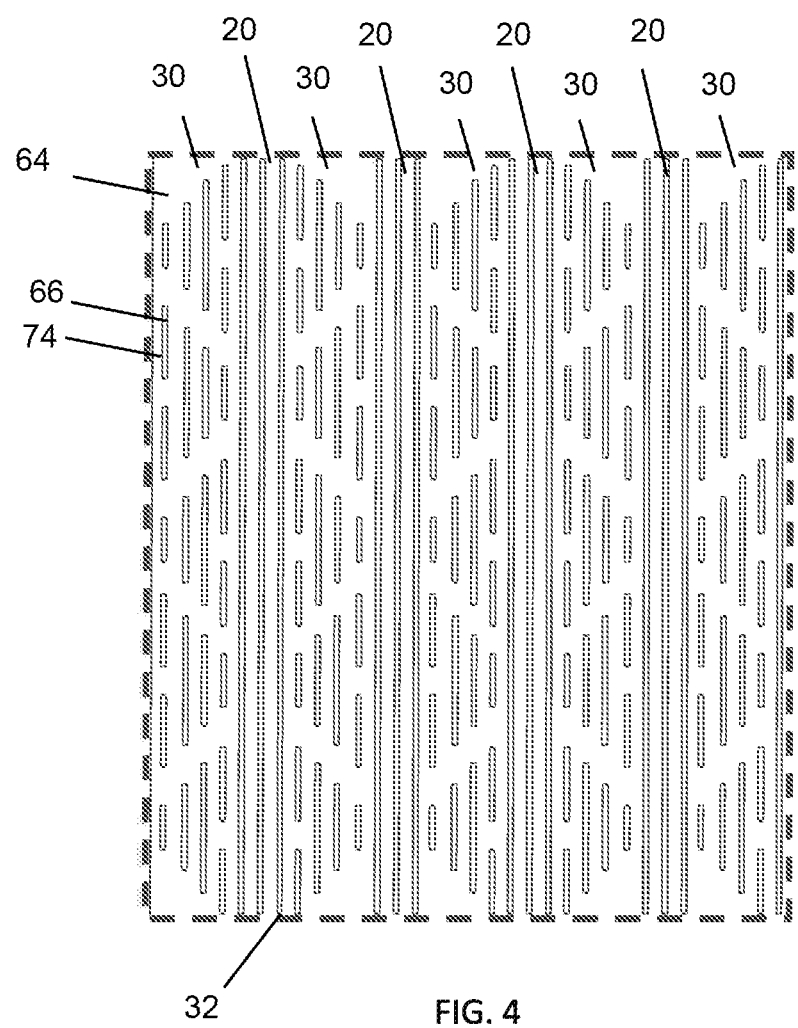
FIG. 4 is a schematic plan view of a portion of the material of the bags of the present invention illustrating a symmetrical pattern.

In one embodiment, the ribs are disposed in a symmetric pattern. In this embodiment, ribs are disposed symmetrically with respect to the bands of continuous features. In symmetric patterns, the actual pattern of ribs in any particular ribbed band may take any form, the pattern in each other ribbed band is arrayed symmetrically with respect to the corrugations of the ring-rolled bands. FIGS. 1, 4, and 6 illustrate symmetric patterns.

In one embodiment the ribs are disposed in an asymmetric pattern with respect to the ring rolled bands. In this embodiment the patter of ribs in each ribbed band is not arrayed symmetrically with respect to the ring rolled bands. The

TABLE HYBR

| Pattern | SELF DOE (inch) | RR DOE (inch) | Growth (%) | Dart | MD TENSILE | | | TD TENSILE | | | MD TEAR | TD TEAR |
|---|---|---|---|---|---|---|---|---|---|---|---|---|
| | | | | | Load at yeild (lbf) | Peak Load (lbf) | Strain at Break (%) | Load at yeild (lbf) | Peak Load (lbf) | Strain at Break (%) | Tear Index (gf) | Tear Index (gf) |
| Force Flex 0.038" | 0.038 | na | NA | 311 | 1.22 | 3.69 | 358.2 | 1.21 | 2.59 | 542.70 | 367.12 | 277.92 |
| MOD 4 Diamond | 0.038 | 0.024 | 12% | 232 | 1.16 | 4.99 | 358.6 | 1.26 | 3.01 | 510.20 | 280.56 | 343.84 |
| MOD 5 Diamond 0.042" | 0.042 | 0.031 | 17% | 351 | 1.15 | 3.94 | 406.5 | 1.32 | 2.95 | 489.29 | 269.8 | 257.3 |

Figure 2:
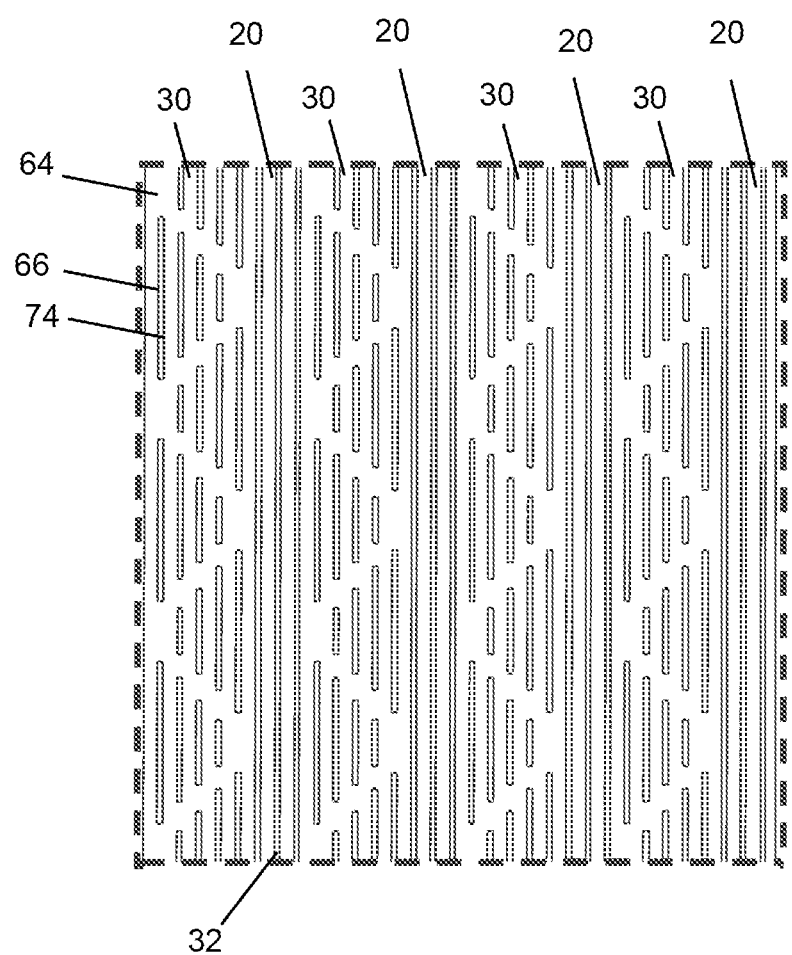
FIG. 2 is a schematic plan view of a portion of the material of the bags of the present invention illustrating an asymmetrical pattern.
Figure 5:
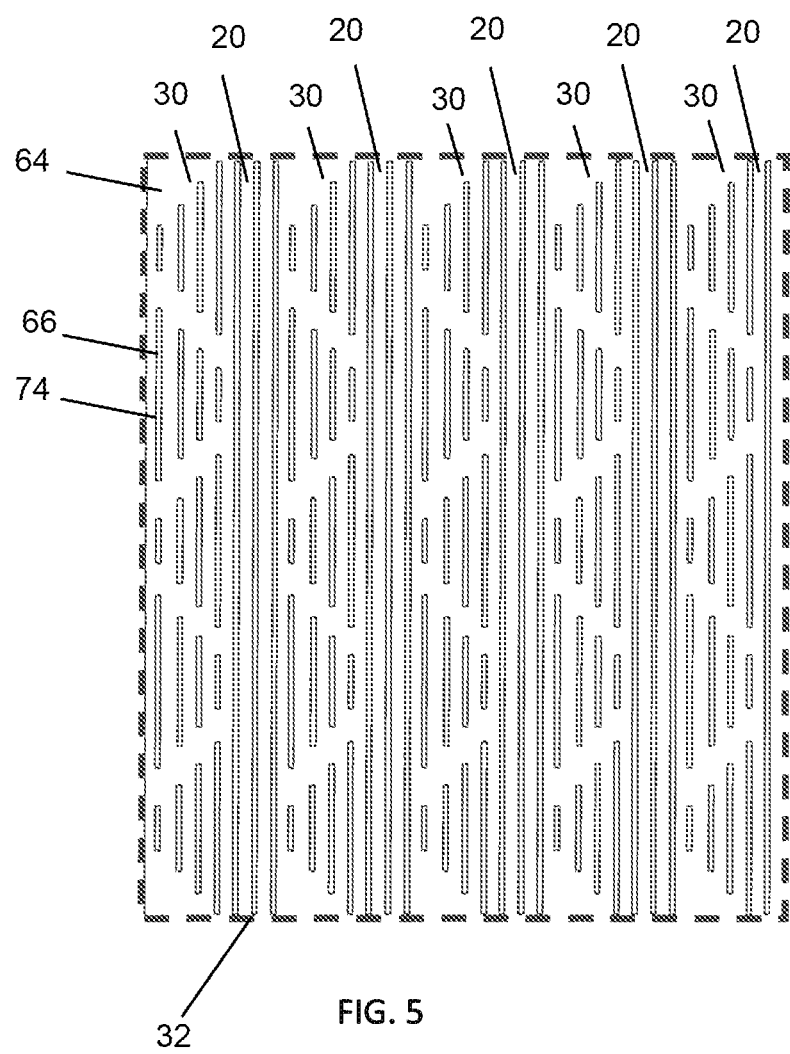
FIG. 5 is a schematic plan view of a portion of the material of the bags of the present invention illustrating an asymmetrical pattern.

As an example, a linear-low-density-polyethylene (LLDPE) film having a base or nominal thickness of 0.0009 inches (0.0223 mm) and a nominal density of 0.918 g/cm$^2$ may be formed with an interleaved pattern of the disclosed bands. The bands are comprised of formed second regions and corrugations as described above. The pitch or spacing of the features across the width of the film is about 0.040 inches (1 mm). The pattern comprises first bands of four adjacent features of discontinuous features adjacent to second bands of three adjacent substantially continuous features. At a depth of engagement (DOE) of about 0.042 inches (1.07 mm), the film exhibits about a 17% growth in area due to the formation process. That is, a square meter of film subjected to the formation process becomes about 1.17 square meters of film. As used herein, "depth of engagement" refers to the extent which the forming elements overlap during the formation of the films disclosed. A 0.042 inch depth of engagement corresponds to an overlap between the two forming elements of 0.042 inches.

degree of asymmetry may range from a simple shift of the pattern of ribs such that the overall pattern of ribs in each ribbed band is similar or substantially identical but the disposition of ribs is shifted along the length of the band such that the pattern is not symmetrical with regard to the ring rolled band. In another embodiment, the pattern in each ribbed band may be identical with regard to the ring rolled bands but not symmetrical. FIGS. 2, and 5 illustrate asymmetric patterns.

In one embodiment symmetric and asymmetric patterns may be used in a single article. As asymmetric patterns reduce the force necessary to extend the film, asymmetric patterns may be used in a portion of the bag where easier extension is desired while symmetric patterns may be used where extension but at a higher level of force is desired.

Substantially identical base films formed with patterns differing as to level of symmetry may have different physical properties. As an example, otherwise identical films, one formed with a symmetric pattern and the other formed with an asymmetric pattern require different level of elongation force to extend each of the films across the width of the formed bands as illustrated in Table 1. The diamond pattern illustrated in FIG. 1 is considered to be symmetric. The zig-zag pattern illustrated in FIG. 2 is considered to be asymmetric.

| Sample | Pattern | Band One DOE (inches) | Band Two DOE (inches) | Growth | Low Force Extension |
|---|---|---|---|---|---|
| 1 | 5 bar diamond | 0.042 | 0.031 | 17% | 12.9% |
| 2 | 5 bar zig-zag | 0.042 | 0.031 | 17% | 16.7% |
| 3 | 5 bar diamond | 0.046 | 0.033 | 19% | 13.8% |
| 4 | 5 bar zig-zag | 0.046 | 0.035 | 22% | 15.6% |
| 5 | 5 bar diamond | 0.050 | 0.039 | 23% | 13.1% |
| 6 | 5 bar zig-zag | 0.050 | 0.039 | 25% | 16.8% |

Table 2 provides comparative physical property data of otherwise identical films formed with a uniform SELF patterns and alternative SELF ring rolled composite patterns.

| Criteria | SELF Target | 4 Broken Diamond (FIG. 4) | 4 Diamond (FIG. 6) | Diamond Shift (FIG. 5) | 5 Diamond (FIG. 1) | 5 Zig Zag (FIG. 2) |
|---|---|---|---|---|---|---|
| Max LFE (% Exp) | 18% | 13.0% | 11.5% | 10.4% | 12.9% | 16.7% |
| Max Growth w/parity Properties (% growth) | 0 | 15% | 15% | 15% | 17% | 16% |
| Parity TD Yield (lbf) | 1.21 | 1.3 | 1.28 | 1.29 | 1.32 | 1.35 |
| TD Tear (gf) | 277.92 | 298.88 | 275.36 | 307.52 | 257.3 | 219.2 |

Test Methods:
Low Force Extension Test Method:
Materials Required:
  1) 8 inch wide (CD) web with at least 6 inches activated with SELF or RR patterns.
  2) 200 g weight and 25 g clamp.
  3) Electronic metric caliper affixed vertically to stand beside the hanging material to be tested.
  4) ¾"×10" stainless steel rod
Test Procedures:
  1) Cut the activated part of the web to 13 cm in the MD and 20 cm in the CD.
  2) Separate the film into one-ply samples.
  3) Lay the film with 13 cm MD perpendicular to your body.
  4) Lay the ⅜" stainless steel rod in the CD and loosely roll the sample in the MD until the 13 cm web is rolled.
  5) Slide the rod out one end so as to leave just the rolled-up web at one end to be a 2 cm flat.
  6) Staple the end of the material at 1 cm to 1.5 cm from the end of the rolled material.
  7) Finish pulling the rod out from the material roll.
  8) Staple the other end at 1 cm to 1.5 cm from the other end of the material roll.
  9) Place the material roll in the upper clamp so that the staple and any flat web is into the clamp.
  10) Hang the bottom clamp and weight onto the roll so that the staple and web are into the clamp leaving only 15 cm of exposed material between the upper and lower clamps. Before allowing any extension of the web, set the caliper gauge to the 15 cm mark of the web and set to "0".
  11) Place the weight and slowly let the weight extend the web.
  12) Slide the caliper to the new extension length of the material and record the measurement.

Various compositions suitable for constructing the flexible bags of the present invention include flexible or pliable thermoplastic material which may be formed or drawn into a web or sheet. Examples of suitable thermoplastic material may include polyethylene, such as, high density polyethylene, low density polyethylene, very low density polyethylene, ultra low density polyethylene, linear low density polyethylene, polypropylene, ethylene vinyl acetate, nylon, polyester, ethylene vinyl alcohol, ethylene methyl acrylate, ethylene ethyl acrylate, or other materials, or combinations thereof, and may be formed in combinations and in single or multiple layers. When used as a garbage can liner, the thermoplastic material may be opaque but in other applications may be transparent, translucent, or tinted. Furthermore, the material used for the sidewalls may be a gas impermeable material.

Once the desired materials are manufactured in any desirable and suitable manner, comprising all or part of the materials to be utilized for the bag body, the bag may be constructed in any known and suitable fashion such as those known in the art for making such bags in commercially available form. Heat, mechanical, or adhesive sealing technologies may be utilized to join various components or elements of the bag to themselves or to each other. In addition, the bag bodies may be thermoformed, blown, or otherwise molded rather than reliance upon folding and bonding techniques to construct the bag bodies from a web or sheet of material. Two recent U.S. patents which are illustrative of the state of the art with regard to flexible storage bags similar in overall structure to those depicted in FIG. 7 but of the types currently available are U.S. Pat. No. 5,554,093, issued Sep. 10, 1996 to Porchia et al., and U.S. Pat. No. 5,575,747, issued Nov. 19, 1996 to Dais et al.

Representative Closures

Closures of any design and configuration suitable for the intended application may be utilized in constructing flexible bags according to the present invention. For example, drawstring-type closures, tieable handles or flaps, twist-tie or interlocking strip closures, adhesive-based closures, interlocking mechanical seals with or without slider-type closure mechanisms, removable ties or strips made of the bag composition, heat seals, or any other suitable closure may be employed. Such closures are well-known in the art as are methods of manufacturing and applying them to flexible bags.

In one embodiment the bag comprises a second sheet of flexible material disposed distal to the opening of the bag as a reinforcing member along the bottom edge of the bag whether that edge comprises a seamed edge or a folded edge. The second sheet may be disposed inside or outside the bag itself. The second sheet may be affixed to the first sheet over the entire area of the second sheet or it may be affixed over only a portion of its area. In one embodiment the second sheet is affixed only along the edges of the second sheet.

Figure 7:
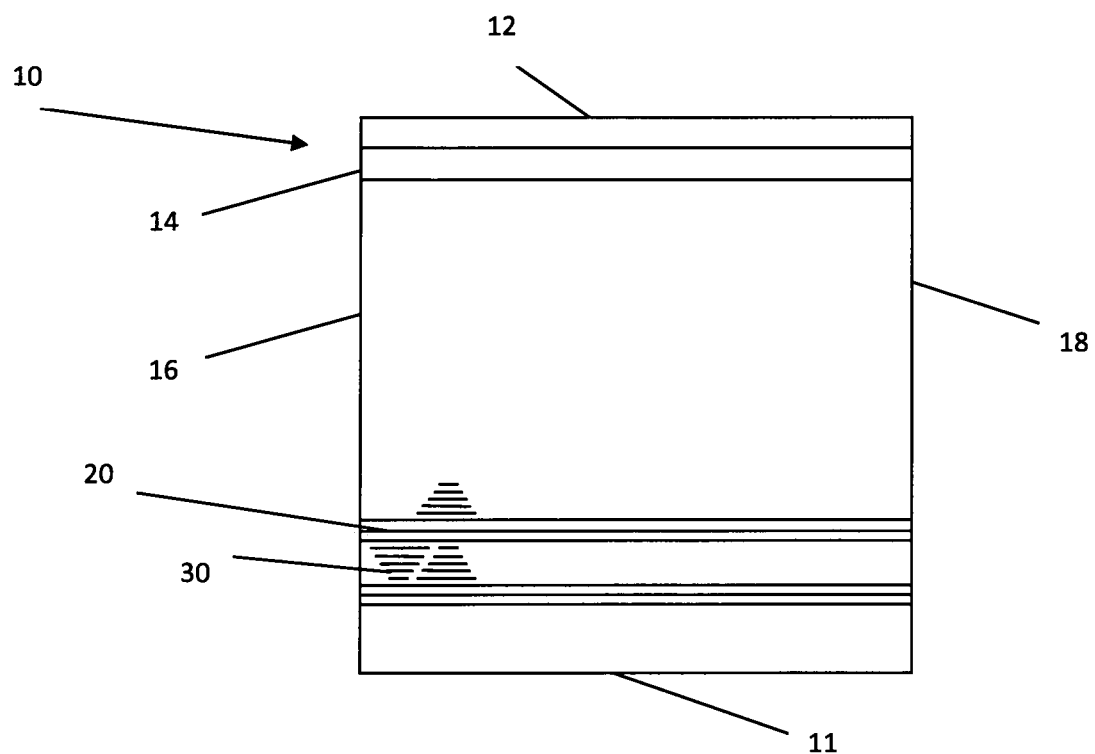
FIG. 7 is a schematic perspective view of a bag according to one embodiment of the invention.

As illustrated in FIG. 7, a bag 10 comprises a film material having interleaved bands 20 and 30. The bag 10 further comprises a bottom edge 11, side edges 16 and 18, a closure 14, an opening 12. First bands 30 are illustrated as only partially comprising features. The first bands 30 may comprise features across all or only a portion of the width of the bag 10. Similarly, the bag 10 may comprise first bands 30 and second bands 20, over all or only a portion of the surface of the bag apart from the closure area 14.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A flexible bag comprising at least one sheet of flexible sheet material assembled to form a semi-enclosed container having an opening defined by a periphery, the sheet of flexible material comprising a first band and a second band disposed adjacent to the first band, both the first and second bands having a length and a width,
   wherein the first band comprises a first film basis weight,
   wherein the first band comprises a strainable network comprising a first region and a plurality of discontinuous second regions,
   wherein at least a portion of the plurality of discontinuous second regions are separated by the first region,
   wherein the first region undergoes a substantially molecular-level deformation and the plurality of second regions initially undergo a substantially geometric deformation when the sheet material is subjected to an applied elongation across the width of the first band,
   wherein the second band comprises a second film basis weight that is lower than the first film basis weight and a plurality of substantially continuous corrugations, and
   wherein each of the plurality of continuous corrugations extends fully along the length of the second band to span an entirety of the length of the second band.

2. The flexible bag of claim 1 comprising a plurality of each of the first and second bands, the plurality of first bands interleaved with the plurality of second bands, wherein the combined pluralities provide a pattern of alternating first and second bands.

3. The flexible bag of claim 2 wherein the first regions of the first bands are arrayed asymmetrically about the second bands.

4. The flexible bag of claim 2 wherein the first regions of the first bands are arrayed symmetrically about the second bands.

5. The flexible bag of claim 1 wherein the basis weight of the first bands is about 23 gsm and the basis weight of the second bands is about 16 gsm.

6. The flexible bag of claim 1 further comprising third bands having substantially the same basis weight as the first bands, the third bands being substantially planar.

7. The flexible bag of claim 1 further comprising a bag closure.

8. The flexible bag of claim 1 further comprising a second layer of flexible film material disposed inside the bag along the edge distal to the opening of the bag.

9. The flexible bag of claim 1, wherein the length of the second band extends fully along a dimension of the sheet of flexible material to span an entirety of the dimension.

10. The flexible bag of claim 9, wherein the full dimension is a width of the sheet of flexible material.

11. The flexible bag of claim 9, wherein the full dimension is a length of the sheet of flexible material.

* * * * *